(12) United States Patent
Klooster

(10) Patent No.: US 8,645,009 B2
(45) Date of Patent: Feb. 4, 2014

(54) METHOD FOR FLYING AN AIRCRAFT ALONG A FLIGHT PATH

(75) Inventor: Joel Kenneth Klooster, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 13/402,986

(22) Filed: Feb. 23, 2012

(65) Prior Publication Data

US 2013/0221164 A1 Aug. 29, 2013

(51) Int. Cl.
*G05D 1/00* (2006.01)
*G05D 3/00* (2006.01)
*G06F 17/00* (2006.01)
*G05D 1/08* (2006.01)
*B64C 19/00* (2006.01)

(52) U.S. Cl.
USPC ...... 701/4; 701/3; 701/14; 244/180; 244/75.1

(58) Field of Classification Search
USPC ................ 701/3, 4, 5, 16; 244/75.1, 180
See application file for complete search history.

(56) References Cited

U.S. PATENT DOCUMENTS

| | | | |
|---|---|---|---|
| 4,862,372 A | 8/1989 | Appleford | |
| 5,337,982 A * | 8/1994 | Sherry | 244/186 |
| 5,574,647 A | 11/1996 | Liden | |
| 5,615,118 A * | 3/1997 | Frank | 701/4 |
| 6,163,743 A * | 12/2000 | Bomans et al. | 701/3 |
| 6,913,228 B2 * | 7/2005 | Lee et al. | 244/135 C |
| 6,921,045 B2 * | 7/2005 | Chang et al. | 244/15 |
| 7,183,946 B2 * | 2/2007 | Boudrieau | 340/945 |
| 7,623,957 B2 | 11/2009 | Bui et al. | |
| 7,970,502 B2 * | 6/2011 | Boorman et al. | 701/11 |
| 8,014,907 B2 * | 9/2011 | Coulmeau | 701/3 |
| 8,180,503 B2 * | 5/2012 | Estabrook et al. | 701/3 |
| 8,265,807 B2 * | 9/2012 | Yamane et al. | 701/15 |
| 8,380,367 B2 * | 2/2013 | Schultz et al. | 701/3 |
| 8,412,392 B2 * | 4/2013 | Jayathirtha et al. | 701/14 |
| 2009/0150012 A1 * | 6/2009 | Agam et al. | 701/3 |
| 2009/0314896 A1 | 12/2009 | Rouquette | |
| 2010/0318244 A1 * | 12/2010 | Gomez et al. | 701/3 |
| 2011/0118908 A1 * | 5/2011 | Boorman et al. | 701/14 |
| 2011/0184593 A1 * | 7/2011 | Swope | 701/12 |
| 2012/0253555 A1 * | 10/2012 | Stange | 701/3 |

OTHER PUBLICATIONS

Search Report and Written Opinion from Corresponding EP Application No. 13156400, dated Jun. 19, 2013.

* cited by examiner

*Primary Examiner* — Thomas Black
*Assistant Examiner* — Tyler Paige
(74) *Attorney, Agent, or Firm* — McGarry Bair PC

(57) ABSTRACT

A method of flying an aircraft, where the aircraft has an associated performance envelope, along a flight path based determining an altitude profile for a cruise-climb along the flight path based on the performance envelope of the aircraft and flying the aircraft along the flight path to approximate the altitude profile.

15 Claims, 3 Drawing Sheets

METHOD FOR FLYING AN AIRCRAFT ALONG A FLIGHT PATH

BACKGROUND OF THE INVENTION

In the flying of contemporary aircraft, meteorological data at waypoints along an aircraft flight path may be considered for determining an estimated time of arrival and fuel burn during an aircraft's flight. Weather data, in general, and wind data (direction and speed at altitude) and temperature data (temperature at altitude), in particular, have a significant impact on flight costs. Specifically, the fuel consumed and the duration of the flight are significantly impacted by wind speeds, wind directions, and atmospheric temperature. A flight management system (FMS) might consider wind velocity and temperature data uploaded to the FMS from a ground station via a communications system while the aircraft is in flight or input by the pilot. While the amount of the available meteorological data is large and may include multiple points along or near the aircraft flight path, there are practical limits to the real-time use of this large amount of data. For example, the FMS may be limited in the number of data points where weather data may be entered.

BRIEF DESCRIPTION OF THE INVENTION

In one embodiment, a method of flying an aircraft, having an associated performance envelope, along a flight path includes determining an altitude profile for a cruise-climb along the flight path based on the performance envelope of the aircraft, determining legal flight levels along the flight path, and flying the aircraft along the flight path in a stepwise manner between the legal flight levels to approximate the altitude profile subject to at least one constraint in stepping between the legal flight levels.

DESCRIPTION OF EMBODIMENTS OF THE INVENTION

A flight path for an aircraft generally includes a climb, a cruise, and a descent. Most contemporary aircraft include a FMS for generating a flight path trajectory 10 and flying the aircraft along the flight path trajectory 10. The FMS may automatically generate the flight path trajectory 10 for the aircraft based on commands, waypoint data, and additional information such as weather data all of which may be received from an airline operations center or from the pilot. Such information may be sent to the aircraft using a communication link. The communication link may be any variety of communication mechanisms including but not limited to packet radio and satellite uplink. By way of non-limiting example, the Aircraft Communications Addressing and Reporting System (ACARS) is a digital datalink system for transmission messages between aircraft and ground stations via radio or satellite. The information may also be input by the pilot.

Figure 1:
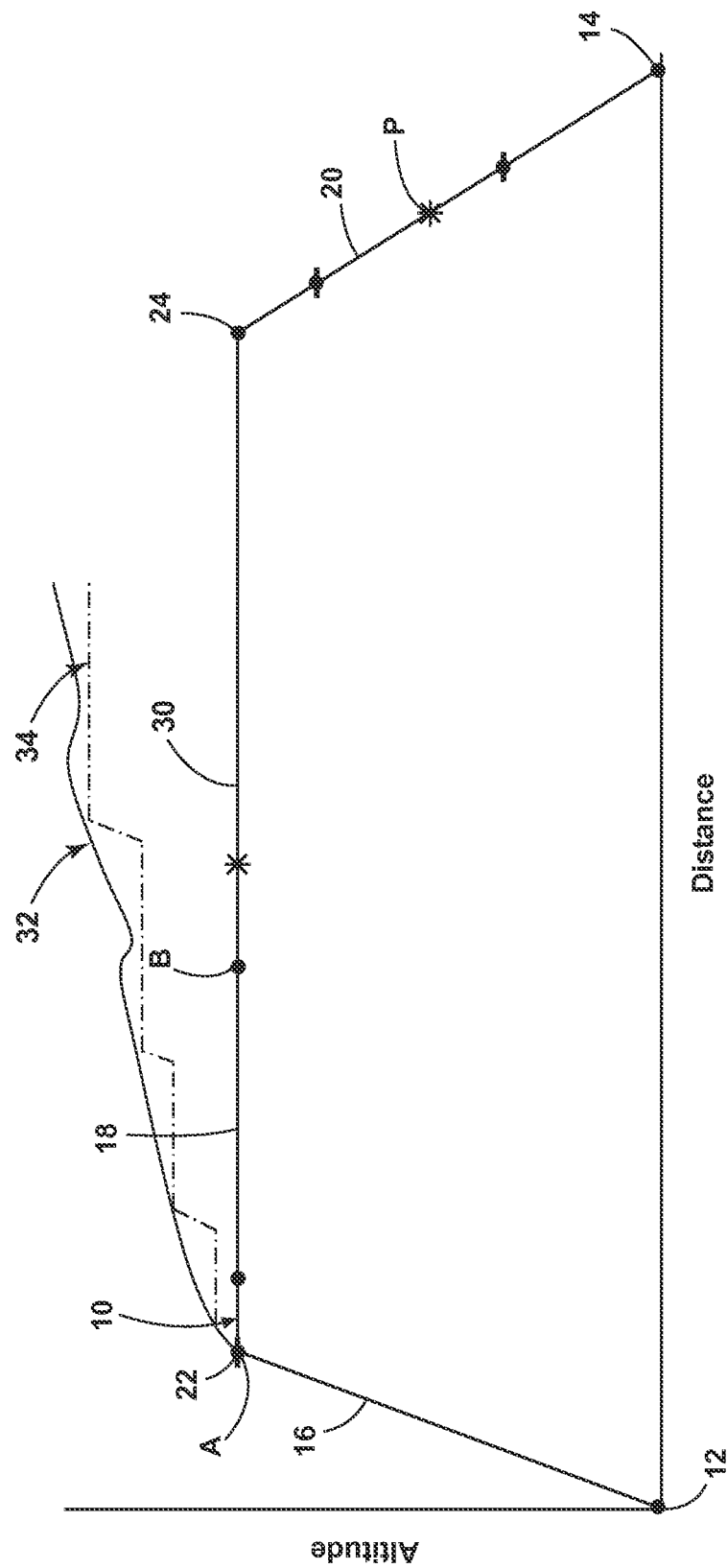
FIG. 1 is a schematic graphical illustration of several flight paths for an aircraft including a flight path according to an embodiment of the invention.

FIG. 1 is a schematic illustration of a flight path for an aircraft in the form of an aircraft trajectory 10. The trajectory begins at a start point 12, such as the departure airport, and ends at an end point 14, such as a destination airport. Traversing between the start point 12 and end point 14 includes a climb phase 16, a cruise phase 18, and a descent phase 20, which are all included in the trajectory 10.

The climb, cruise and descent phases 16, 18, and 20 are normally input into an FMS as data points. For purposes of this description, the term data point may include any type of data point including waypoints, enroute waypoints, and altitudes and is not limited to a specific geographic position. For example, the data point may just be an altitude or it may be a specific geographic location, which may be represented by any coordinate system, such as longitude and latitude. By way of non-limiting example a data point may be 3-D or 4-D; a four dimensional description of the aircraft trajectory 10 defines where in 3D space the aircraft is at any given point of time. Each of the data points may include associated information, such as weather data that may include temperature data and wind data, with or without wind direction.

For the climb, a data point corresponding to the altitude A at the top of the climb 22 may be input, for the cruise phase 18 enroute waypoints B may be input; and for the descent phase 20 various altitudes may be input. After takeoff, an aircraft typically remains in the climb phase 16 to the top of climb 22 and then it follows the enroute waypoints during the cruise phase 18 to the top of the descent 24 where it then starts the descent phase 20. The altitudes A in the climb phase 16 and the descent phase 20 are waypoints in the sense that the aircraft is achieving its trajectory 10 to such altitudes during these phases. The enroute waypoints B may be selected based upon the location of ground navigation aids (Navaids) along the trajectory 10 of the aircraft. Pseudo-waypoints P may also be included in the trajectory 10 and are artificial reference points created for some purpose relevant to a parameter of the trajectory 10 and are not limited to ground navigation aids. They can be defined prior to or after established data points for the trajectory have been set. Pseudo-waypoints can be defined in various ways, such as by latitude and longitude or by a specified distance along the current trajectory, such as an along-track waypoint.

Weather data, such as wind and temperatures aloft, may be entered for any of the data points. Such weather data improves FMS flight predictions. The weather data may be obtained from a weather database, which may contain real-time weather data or forecasted weather data. Such weather databases may contain data regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature and wind must be accounted for in trajectory calculations to ensure that the aircraft can accurately conform to the desired trajectory, the weather database may include 3-D real-time temperature and wind models of the local airspace as well as 4-D forecasted data. The weather database may store such real-time or forecasted weather data at a specific latitude, longitude, and altitude.

Accurate weather data provides for better representation of weather profiles in the vicinity of an aircraft's trajectory will produce more accurate FMS predictions, thereby resulting in improved estimations of aircraft fuel usage and arrival time. The more weather data used to prepare the weather profiles will typically result in a more accurate weather profile as will the more up-to-date is the weather data. However, the ability to submit all relevant weather data from the weather database to the FMS from a ground station may be limited by the FMS itself as the FMS typically limits the number of data points on the flight trajectory for which weather data may be entered and ultimately used in the trajectory prediction. In many FMS, the total number of permitted data points is less than 10 while the weather database may have hundreds of relevant data points for the trajectory.

It may be understood that during the cruise phase 18 there may be some changes in altitude especially for transcontinental flights where an aircraft may change its elevation to take advantage of or minimize the impact of prevailing winds, such as the jet stream, to climb to higher altitudes as fuel is burned, or to avoid turbulence. Airlines today typically file a flight plan which includes only a single cruise altitude. However, on most flights it is much more cost effective to change cruise altitudes as fuel is burned and wind and temperature conditions change. Some more advanced FMSs provide functionality on board the aircraft to determine when it is more beneficial to step to a new cruise altitude; however, many FMS do not have this functionality, and even those that do provide the functionality are not able to evaluate airspace constraints, such as potential conflicts with other aircraft, when performing these computations and typically compute only one step location. Moreover, cruise altitude changes typically require coordination with the airline's flight dispatcher, who does not have this information readily available.

Most modern FMS allow cruise wind to be entered only by cruise waypoint. Further, contemporary FMS may only allow for one wind level in the FMC, which prevents onboard calculation of wind-optimal cruise altitude or an optimal step climb point based on winds and weight and results in a constant altitude cruise 30. Some long-range aircraft may take winds at up to 5 flight levels at each waypoint, allowing a computation of the wind optimal cruise altitude and a single location to optimize a cruise step to a higher cruise level. However, if winds vary significantly across the cruise portion of a flight, multiple waypoints would need to be defined along the flight path to specify winds to be used in the FMS. Moreover, many FMSs can use wind only at the currently defined cruise level, making it impossible to determine the wind optimal cruise level on board the aircraft. In addition, the benefit from any cruise altitude optimization depends on the accuracy of the predicted wind data, which varies significantly depending on the weather forecast service used to obtain it.

A theoretical cruise profile would use a constant thrust setting on the auto-throttle, which would result in a generally continuously climbing profile, assuming constant weather conditions, with a decreasing rate of climb as the maximum altitude is approached. This maximum altitude increases as the aircraft gross weight decreases, until the absolute maximum flight level is reached. The stable cruising trajectory at this point would not be at a fixed altitude, but would vary as ambient wind and temperature conditions change, impacting that actual thrust achieved. This may create a cruise-climb, which is considered the most efficient manner in which to climb. Typically, a cruise-climb is based on setting the thrust of the engine at its most efficient position, which is normally a maximum continuous thrust level, and then letting the aircraft climb naturally as it burns off fuel. When there is a fixed force in the fixed thrust, a fixed lift will result and as the aircraft loses weight from burnt fuel, the fixed lift will cause the aircraft to increase in altitude (climb) into thinner air, which reduces the lift. Thus, on a cruise-climb, the aircraft naturally seeks an equilibrium altitude based on the thrust setting and the current weight of the aircraft. Such a theoretical cruise-climb profile 32 is schematically illustrated. The theoretical cruise-climb profile 32 is not currently achievable due to limitations in current aircraft flight control systems, air traffic, and the assignment of flight levels by Air Traffic Control for separation. It should be noted that takeoff and descents are largely regulated by the local Air Traffic Control.

As the theoretical cruise-climb profile is the most efficient but not practically possible; it has been determined that an approximation to this theoretical cruise-climb profile 32 may be achieved by using a stepwise climb approach that is subject to constraints. Embodiments of the invention compute multiple step locations and cruise altitudes for the theoretical cruise-climb profile 32 and take into account air traffic control procedures and constraints and may result in a step climb schedule 34, which approximates the cruise-climb with the applicable constraints. The embodiments of the invention include a method of flying an aircraft, having an associated performance envelope, along a flight path. It will be understood that the performance envelope may include, among other things, a constant thrust level for the aircraft. This may include the maximum climb thrust and/or the maximum constant thrust of the aircraft. The method includes determining an altitude profile for a cruise-climb based on the performance envelope of the aircraft, determining legal flight levels along the flight path, and flying the aircraft along the flight path in a stepwise manner between the legal flight levels to approximate the cruise-climb profile subject to at least one constraint in stepping between the legal flight levels. The term legal flight levels refers to the flight levels permitted by ATC for the given trajectory. To ensure aircraft separation, it is common permit cruise flight at certain predetermined flight levels. For example, East-West traffic may have one set of legal flight levels while North-South traffic may have a different set of legal flight levels, and the two sets do not overlap, which tends to prevent mid-air collisions. Other factors may also limit the legal flight levels.

Determining an altitude profile for a cruise-climb along the flight path may include calculating a theoretical cruise-climb profile 32 or other similar constant cruise-climb profile. Using equations of motion that are well known to those familiar with the art of aircraft trajectory computation, the vertical trajectory of the aircraft for a given thrust setting may be computed. One such method would be using the general aircraft equation of motion shown in Equation 1, which is based on the conservation of energy principle as applied to two points along the aircraft trajectory. This is sometimes referred to as the energy exchange equation. In this equation, $dV_T/dh$ represents the change in true airspeed over altitude.

$$VS = \frac{\left(\frac{T-D}{W}\right) * V_T}{C_{TMP} + \left(\frac{V_T}{g}\right) * \left(\frac{dV_T}{dh}\right)} \quad (1)$$

Where:

$VS$ = Vertical Speed in $fps$, $T$ = Thrust in pounds, $D$ = Drag in pounds, $W$ = Weight in pounds, $V_T$ = True Air Speed in $fps$, $G$ = Gravitational Acceleration -continued $\frac{dV_T}{dh}$ = Change in inertial speed with altitude, computed from change in groundspeed $C_{TMP}$ = Energy Exchange Temperature Coefficient Equation 2 represents the energy exchange equation using the change in true airspeed over time, $dV_T/dt$, instead.

$$VS = V_T * \frac{\frac{(T-D)}{W} - \left(\frac{1}{g}\right)*\left(\frac{dV_T}{dt}\right)}{C_{TMP}} \quad (2)$$

Figure 2:
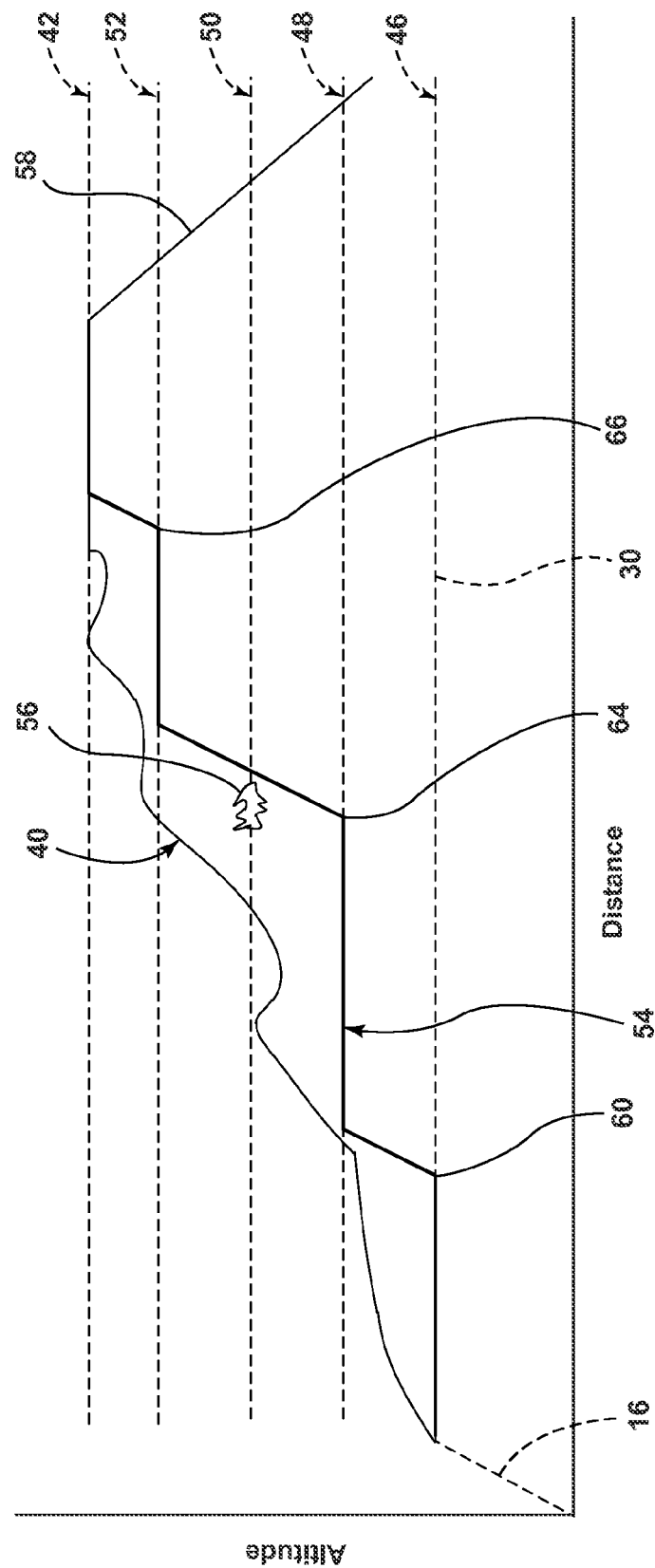
FIG. 2 is a schematic graphical illustration of results of a method according to an embodiment of the invention.

Either equation may be used to determine a cruise-climb altitude profile. The altitude profile for the cruise-climb may include the altitude of the aircraft along the flight path while flying the aircraft at a constant thrust level. For example, in these equations, the Thrust (T) used may be either the maximum climb thrust or the maximum constant thrust based on the performance envelope of the aircraft to be flown. Potentially, a combination could be used where the maximum climb thrust is used below a given altitude such as the original cruise altitude and the maximum constant thrust is used above that altitude. The thrust from an aircraft engine as well as the airframe drag vary with temperature, so the vertical speed will vary significantly as temperature varies. This may lead to a cruise-climb altitude profile 40 having a very non-linear vertical path, as shown in FIG. 2. The cruise-climb altitude profile 40 may also be limited to the maximum rated altitude 42. That is, if the cruise-climb altitude profile 40 eventually reaches a prescribed maximum altitude 42, the cruise-climb altitude profile 40 should level-off at that altitude rather than continuing to climb.

With considerations given for air traffic constraints, it is contemplated that legal flight levels along the flight path may be determined. Such legal flight levels have been schematically illustrated as legal flight levels 46, 48, 50, and 52. These legal flight levels 46, 48, 50, and 52 define altitudes at which the aircraft may fly for air traffic clearance purposes. The maximum rated altitude 42 may also be a legal flight level for air traffic clearance purposes. While four intermediate legal flight levels have been illustrated, it is contemplated that any number of legal flight levels may be determined along the flight path. Further such legal flight levels may change depending upon the flight path. The aircraft may then be flown along the flight path in a stepwise manner between the legal flight levels 46, 48, 50, and 52 up to the maximum rated altitude 42 to approximate the cruise-climb altitude profile 40. In this manner, the legal flight levels 46, 48, 50, and 52 define the possible intermediate cruise altitudes that the aircraft could step to, either climbing or descending between altitudes, as the weight, wind, and temperature change throughout the flight.

The flying of the aircraft in a stepwise manner as schematically illustrated as flight path 54 may be subject to at least one constraint in stepping between the legal flight levels. For example, one constraint may by flying a predetermined distance along a legal flight level before making a step to another legal flight level. For example, it may be desired that each intermediate cruise altitude is maintained for at least 50 nautical miles before climbing or descending to a new altitude to avoid wasting fuel. This may be done by searching for a new step point at a point that is the predetermined minimum from the start of the previous cruise altitude.

Another constraint may be that the flight must fly at legal flight levels below the cruise-climb altitude profile 40 while flying along the flight path in the stepwise manner. This may be done by determining the next legal flight level that is completely below the cruise-climb altitude profile 40 for at least the predetermined minimum of 50 nautical miles. The legal flight levels may be stepped through during such determination to determine if they fit such a constraint.

Yet another constraint may be that the flight path 54 must be constructed such that the aircraft must fly at a highest legal flight level that is below the cruise-climb altitude profile 40. It is contemplated that in determining the steps for the flight path 54 that the legal flight levels may be stepped through during such determination to determine if they fit the given constraints. If there are no higher cruise altitudes below the cruise-climb altitude profile 40 and the aircraft may be flown at such a highest legal flight level for at least 50 nautical miles, then a final determination may be made that the legal flight level is a valid flight level for the next step of the flight path and the altitude may be used as the new intermediate cruise altitude.

Flying the aircraft along the flight path 54 in a stepwise manner may be subject to yet another constraint that hazards, such as the hazard 56, on the flight path must be avoided. The hazard 56 may include things such as conflicts with other aircraft such as when the aircraft would be less than a defined minimum separation distance from another aircraft, turbulence, or other weather hazards. It is contemplated that such a hazard 56 may also be probability based, that is that the hazard must be above some probability or likelihood of actually occurring to merit being an actual hazard to be considered. If such a hazard 56 occurs at the legal flight level being evaluated for a step of the flight plan, then the legal flight altitude is not valid for the next step of the flight plan. If the legal flight level being evaluated is the highest legal flight level, the next lower legal flight level may be evaluated. If a hazard occurs at the legal flight level and is more than the predetermined minimum amount of 50 nautical miles from the start of the step, then the trial altitude may still be considered valid for the next step of the flight path and the altitude may be used as the new intermediate cruise altitude.

When it is determined that a legal flight level is valid for a cruise altitude change, that step, which may be either a climb or descent, to the new altitude as a cruise step point, and record the new intermediate cruise altitude. Such determinations for new altitudes for each step of the flight plan may be determined for the entirety of the cruise portion of the flight plan.

It is contemplated that a descent profile 58 may be determined along the flight path of the aircraft. The descent profile 58 may be computed backwards from the destination airport/runway (not shown) until it intersects either the pre-defined maximum altitude 42 or the cruise-climb altitude profile 40. This will define the true optimum profile that could be flown in the absence of any type of air traffic constraints. The aircraft may be flown along the flight path 54 in a stepwise manner until such an intersection is reached at which point the aircraft may be operated to descend according to the descent profile 58.

With continued reference to FIG. 2, it may be understood that the constant altitude cruise 30 is equal to legal flight level 46. An initial iteration of the determining what legal flight level to fly the aircraft at during the flight plan 54 may determine that a step climb may be performed to legal flight level 48 at point 60. At a predetermined minimum amount of 50 nautical miles after point 60, which has been schematically illustrated as point 62, a determination may be made regarding the next step along the flight path 54. Legal flight level 50 may be tried to see if it is valid; however, the hazard 56 exists along the legal flight level 50, so that segment of the legal flight level 50 is declared no longer legal, and the determination continues. Although the legal flight level 50 would be a legal and valid altitude beyond the hazard 56, the process determines that legal flight level 52 is also legal and valid beyond the point 62, and since it is a higher altitude the process determines that the legal flight level 52 should be used as the legal flight level at the step 64 along the flight path 54. It may be understood that if a hazard also existed at legal flight level 52, then legal flight level 50 may have been chosen as the cruise altitude for a step the began beyond the hazard 56. In the illustrated example, from legal flight level 52, the maximum altitude 42 becomes the next legal and valid altitude chosen and a step at 66 from 52 to the maximum altitude 42 may be included in the flight plan. At this point, there are no more legal altitudes to evaluate and there are no hazards along the final altitude, so the process of determining steps terminates. The aircraft may be flown along such a flight path in the determined stepwise manner to approximate the cruise-climb altitude profile 40.

Figure 3:
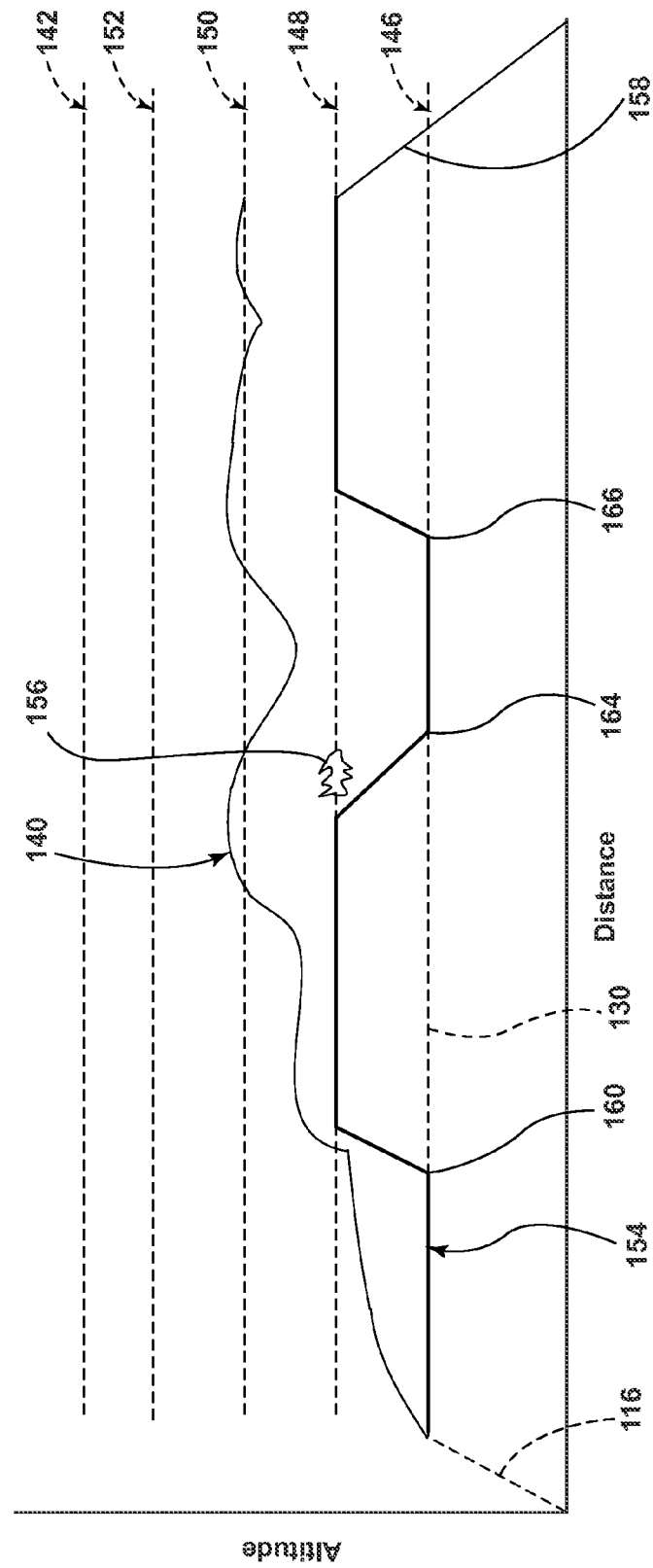
FIG. 3 is a schematic graphical illustration of results of a method according to an embodiment of the invention.

FIG. 3 illustrates a second embodiment of a method of flying an aircraft according to an embodiment of the invention. The second embodiment is similar to the first embodiment; therefore, like parts will be identified with like numerals increased by 100, with it being understood that the description of the like parts of the first embodiment applies to the second embodiment, unless otherwise noted. As with the first embodiment, an original cruise altitude is designated at 130, a cruise-climb altitude profile 140 has been determined, legal flight levels 146, 148, 150, and 152 along the flight path have been determined, and a maximum altitude has been designated at 142. For the flight path 154, it may be determined that legal flight level 148 is a legal and valid intermediate cruise altitude and a step at 160 to this intermediate cruise may be included along the flight path 154 because it is the highest altitude below the cruise-climb altitude profile 140. Although the hazard 156 exists at this altitude it is more than a predetermined minimum distance, such as 50 nautical miles, from the start at 160 of the intermediate cruise at legal flight level 148 thus the aircraft may be flown at the legal flight level 148 until the hazard 156 is reached. Because there are no higher legal flight levels below the cruise-climb altitude profile 140, a lower altitude, legal flight level 146, is required to avoid the hazard 156. Thus, a step descent at 164 to legal flight level 146 may be included in the flight path 154 to avoid the hazard 156. After at least the predetermined minimum distance at legal flight level 146, alternative legal flight levels may again be evaluated. Because there are no hazards on legal flight level 148 beyond the new search start point 166 and because it is the highest level below the cruise-climb altitude profile 140 for a predetermined minimum distance, a cruise step climb to legal flight level 148 at 166 may be included in the flight path 154. Because there are no more hazards at legal flight level 148 and there are no more legal higher altitudes to evaluate below the cruise-climb altitude profile 140, the process terminates and the aircraft may be flown in a step wise manner according to the flight path 154.

It will be understood that stepwise flight plans may be determined in the above manner and that an aircraft may then be flown in such a stepwise manner. It is contemplated that computing such multiple step locations and cruise altitudes to determine a step climb schedule or stepwise flight plan may be determined on the ground by a suitable computer or processor and provided to the aircraft via a communication system, such as a wireless communication system. Alternatively, the determination of such a stepwise flight plan may be done by a computer, processor, or the FMS onboard the aircraft itself, either before or during flight. Such a stepwise flight plan may also be provided to an airline flight dispatcher or Air Traffic Control. The technical effect of the above embodiments being that the multiple step locations and cruise altitudes for the theoretical cruise profile may be computed such that a stepwise flight plan may be determined and the aircraft may be flown in a more efficient stepwise manner than is currently capable.

The above embodiments provide a variety of benefits including a method of quickly computing a stepwise manner to fly an aircraft between legal flight levels where the resulting flight path is conflict free. Such a flight by the aircraft may result in less fuel burned, which may significantly reduce operating costs. Further, the embodiments described above do not require multiple sets of cruise altitudes, which significantly improves processing speeds in determining the stepwise manner in which the aircraft is to be flown. Furthermore, by determining the altitude profile for a cruise-climb along the flight path based on the performance envelope of the aircraft the stepwise manner that is determine is better than existing FMS methods. Finally, by taking into account Air Traffic Control constraints such as legal altitudes and airspace constraints, the above described embodiments provides a solution that is likely to be granted by air traffic control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of flying an aircraft, having an associated performance envelope, along a flight path, the method comprising:
    determining, by a processor, a theoretical altitude profile for a cruise-climb along the flight path based on the performance envelope of the aircraft;
    determining, by a processor, legal flight levels along the flight path; and
    flying the aircraft along the flight path in a stepwise manner between the legal flight levels to approximate the theoretical altitude profile for the cruise-climb subject to at least one constraint in stepping between the legal flight levels.

2. The method of claim 1 wherein the performance envelope comprises a constant thrust level for the aircraft.

3. The method of claim 2 wherein the theoretical altitude profile for the cruise-climb comprises the altitude of the aircraft along the flight path while flying the aircraft at the constant thrust level.

4. The method of claim 1, further comprising determining a descent profile along the flight path.

5. The method of claim 4, further comprising determining an intersection of the theoretical altitude profile for the cruise-climb and the descent profile.

6. The method of claim 5 wherein the flying the aircraft along the flight path in a stepwise manner is ceased based on the determined intersection.

7. The method of claim 1 wherein the at least one constraint comprises flying at flight levels below the theoretical altitude profile for the cruise-climb along the flight path.

8. The method of claim 7 wherein the at least one constraint further comprises flying at least a predetermined distance along a flight level.

9. The method of claim 8 wherein the predetermined distance is 50 miles.

10. The method of claim 8 wherein the at least one constraint further comprises avoiding a hazard on the flight path.

11. The method of claim 10 wherein the at least one constraint further comprises flying at a highest legal flight level.

12. The method of claim 1 wherein the at least one constraint comprises flying at least a predetermined distance along a flight level.

13. The method of claim 12 wherein the predetermined distance is 50 miles.

14. The method of claim 12 wherein the at least one constraint comprises avoiding a hazard on the flight path.

15. The method of claim 14 wherein the at least one constraint further comprises flying at a highest legal flight level.

\* \* \* \* \*